March 4, 1924. 1,485,602
A. H. FLEISCHER
COOKING UTENSIL
Filed June 21, 1923

Patented Mar. 4, 1924.

1,485,602

UNITED STATES PATENT OFFICE.

ARNOLD H. FLEISCHER, OF MILWAUKEE, WISCONSIN.

COOKING UTENSIL.

Application filed June 21, 1923. Serial No. 646,824.

*To all whom it may concern:*

Be it known that I, ARNOLD H. FLEISCHER, a citizen of the United States, and resident of Milwaukee, in the county of Milwaukee and State of Wisconsin, have invented certain new and useful Improvements in Cooking Utensils; and I do hereby declare that the following is a full, clear, and exact description thereof.

This invention relates to cooking utensils.

Objects of this invention are to provide a cooking utensil of the double boiler type in which control of the temperature both externally and internally of the inner receptacle may be most readily had, in which provision is made for opening either a portion only of the cover of the inner receptacle or for opening the entire cover in a very simple and easy manner, and to provide means whereby the lower or water bath portion may be closed and readily lifted from the stove when the inner container is removed.

Further objects are to provide an adjustable handle for the inner container which may extend either outwardly at a slight angle to the horizontal or may extend outwardly and upwardly at a large angle to the horizontal, thereby providing additional room on a stove for other utensils without crowding them by the outwardly projecting handle, and to provide a double boiler in which the inner utensil is provided with a spout and a cover plate whereby either the liquid may be readily poured therefrom or else the liquid may be drained from the articles contained in such utensils as the cover plate will form an effective shield in order to prevent the outward falling of the articles.

An embodiment of the invention is shown in the accompanying drawings, in which:—

Figure 1:
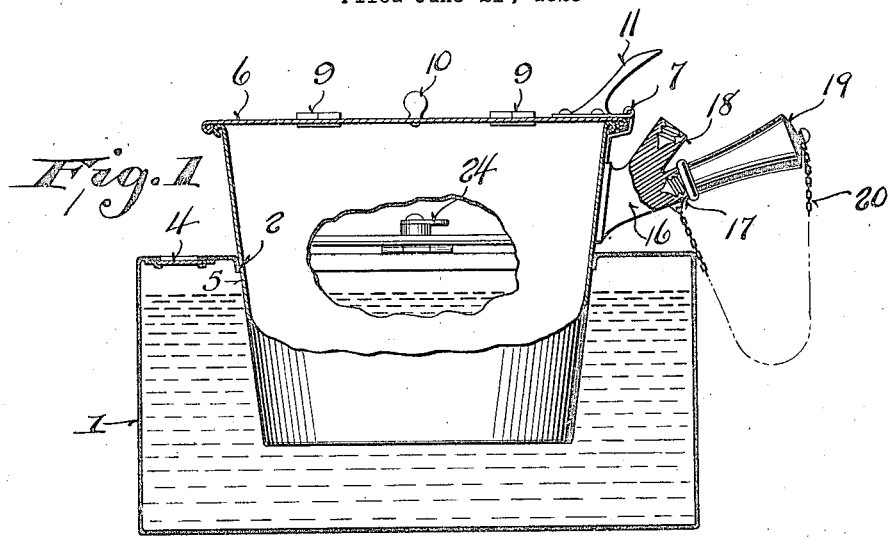
Figure 1 is a sectional elevation through the apparatus.
Figure 2:
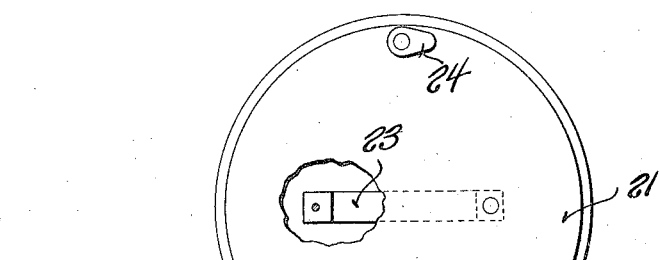
Figure 2 is a plan view thereof with parts broken away.
Figure 2:
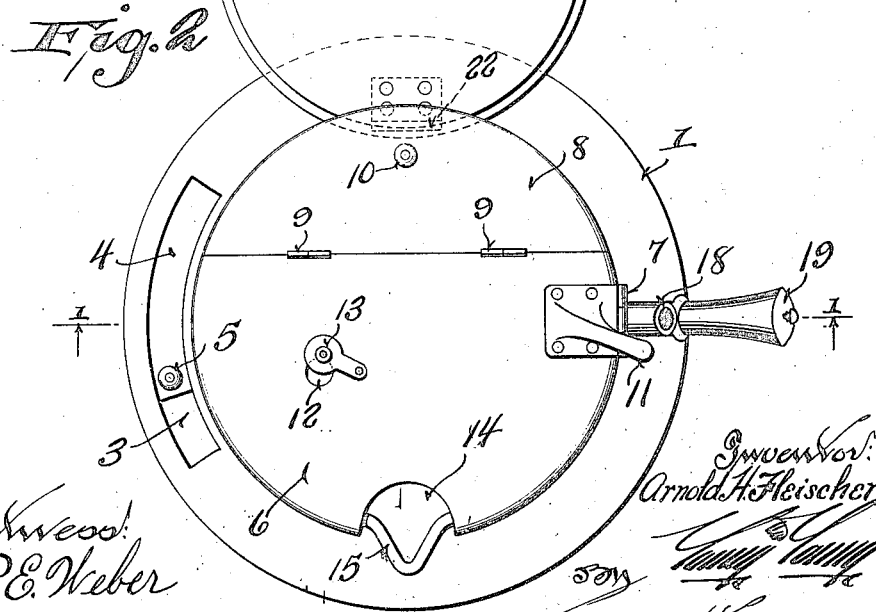

The device comprises an outer container 1 adapted to receive water and preferably formed in a circular shape with a relatively large tapered aperture 2 centrally located on its upper side. This bottom portion is provided with an annular cutout 3 adjustably covered by a slide 4 provided with a manipulating handle 5, so that the escape of steam from the lower compartment may be most easily controlled and consequently a control of the temperature therein may thus be had.

It is to be noted that the construction is such that the tapered walls 5 of the upper portion or inner container accurately fit the tapered surface of the central aperture 2 and thus provides a tight joint between the parts. This, therefore, aids in the control of the temperature within the lower portion as it prevents the escape of steam around the inner container and allows the escape of steam to be wholly controlled by the slide 4.

The inner container comprises a frusto-conical member having tapered side walls 5 previously mentioned, a bottom and a hingedly mounted top. The top comprises a main portion 6 which is hinged, as indicated at 7, to the side of the container. This main cover 6 is provided with an auxiliary cover 8 which is hinged, as indicated at 9, to the main cover. The auxiliary cover is provided with a manipulating handle 10 so that it may be raised to provide access to the inner container through a small entrance opening without uncovering the entire container. A projecting thumb piece 11 is secured to the main cover 6 and is adapted to be depressed by the thumb of the operator to open the entire cover,—the auxiliary portion 8 moving as a unit with the main portion 6 and rocking upwardly about the pivot portion 7. The main portion is provided with an aperture 12 adapted to be adjustably closed by a pivotally mounted cover 13 to thus regulate the total opening through the cover.

It is to be noted that the cover 6 is provided with a cut out 14 of relatively small extent adjacent a spout 15 formed from the side wall 5. A handle bracket 16 is secured to the side wall 5 and is provided with two angularly arranged internally threaded bosses 17 and 18 each adapted to receive the threaded inner end of a handle 19—loss of the handle being conveniently prevented by means of the chain 20. It will be seen that the handle 19 may be used in the position shown in Figure 1. It is also to be noted that the handle may be removed from the boss 17 and secured within the boss 18. When so positioned it projects upwardly at a greater angle and thus allows more room on the stove and permits the closer spacing of adjacent utensils.

When the inner utensil hereinafter referred to as a pot is removed from the outer and lower compartment 1 hereinafter referred to as a tank it is highly desirable that some means be provided for easily lifting the tank. This is readily secured by providing a cover 21 for the tank and hinging it thereto as indicated at 22. This cover is provided with a strap handle 23 and with a locking clip 24 adapted to engage beneath the edge of the tank when the cover 21 is closed. It will be seen from this last described construction that scalding of the operator's hands by rising steam from the tank is prevented and that the tank may be most readily lifted when the pot is removed.

It will thus be seen that a cooking utensil has been provided, in which accurate control of the temperature may be had, in which an adjustably mounted handle is provided for the pot, and in which ready means for lifting the tank is provided.

Although one form of the invention has been described in considerable detail, it is to be understood that the invention may be variously embodied and is, therefore, to be limited only as claimed.

I claim:

A cooking utensil comprising a pot, a handle projecting therefrom, a cover having a main part and a relatively smaller part hinged to said main part to provide access through a restricted opening to said pot, a hinge joining said main part to said pot adjacent said handle and having its axis extending at right angles to the hinged joint between said main part and said smaller part, and a thumb piece carried by said main part and located adjacent to and slightly offset from the center line of said handle.

In testimony that I claim the foregoing I have hereunto set my hand at Milwaukee, in the county of Milwaukee and State of Wisconsin.

ARNOLD H. FLEISCHER.